US008377310B2

(12) United States Patent
Iannicelli

(10) Patent No.: US 8,377,310 B2
(45) Date of Patent: Feb. 19, 2013

(54) METHOD AND COMPOSITION FOR SORBING TOXIC SUBSTANCES

(75) Inventor: Joseph Iannicelli, Brunswick, GA (US)

(73) Assignee: J.I. Enterprises, Inc., Brunswick, GA (US)

( * ) Notice: Subject to any disclaimer, the term of this patent is extended or adjusted under 35 U.S.C. 154(b) by 0 days.

(21) Appl. No.: 12/777,331

(22) Filed: May 11, 2010

(65) Prior Publication Data

US 2010/0224567 A1 Sep. 9, 2010

Related U.S. Application Data

(62) Division of application No. 12/537,907, filed on Aug. 7, 2009, now Pat. No. 7,807,058, which is a division of application No. 11/277,282, filed on Mar. 23, 2006, now Pat. No. 7,763,566.

(51) Int. Cl.
*C02F 1/42* (2006.01)
(52) U.S. Cl. ..... 210/688; 210/681; 423/121; 423/561.1; 423/563; 502/406
(58) Field of Classification Search .......... 423/119, 423/121, 658.5, 563, 561.1; 210/681, 688; 502/406
See application file for complete search history.

(56) References Cited

U.S. PATENT DOCUMENTS

| | | | |
|---|---|---|---|
| 3,469,935 A | 9/1969 | Hrishikesan et al. | |
| 4,075,125 A | 2/1978 | Morimoto et al. | |
| 4,560,465 A * | 12/1985 | Yu et al. | 208/59 |
| 4,982,027 A | 1/1991 | Korff et al. | |
| 5,308,500 A | 5/1994 | Schwarzbach | |
| 5,441,648 A | 8/1995 | Lidzey | |
| 5,529,566 A | 6/1996 | Weil | |
| 5,877,393 A | 3/1999 | Webster | |
| 6,050,929 A | 4/2000 | Forrester | |
| 6,153,108 A | 11/2000 | Klock et al. | |
| 6,238,570 B1 | 5/2001 | Sivavec | |
| 6,245,200 B1 * | 6/2001 | Wilcoxon | 204/157.15 |
| 6,342,162 B1 | 1/2002 | Heidenreich | |
| 6,464,864 B2 | 10/2002 | Sivavec | |
| 6,476,287 B1 | 11/2002 | Hale, III et al. | |
| 6,896,817 B2 | 5/2005 | Bowers | |
| 6,906,235 B2 | 6/2005 | Funakoshi et al. | |
| 2005/0173350 A1 | 8/2005 | Bowers | |

FOREIGN PATENT DOCUMENTS

GB 1434341 5/1976
JP 48102094 A 12/1973

OTHER PUBLICATIONS

Hans et al., Development of Pellet-type Adsorbents for Removal of Heavy Metal Ions from Aqueous Solutions Using Red Mud, 2002, J.Ind. Eng.Chem., vol. 8, No. 2, pp. 102-125.*
Ordonez et al., Characterisation and deactivation studies of sulfided red mud used as catalyst for the hydrodechloration of terrachloroethylene, Applied Catalysis B: Environmental, 29, 2001, 263-273.*
Ryle, G., "The Great Red Mud Experiment that Went Radioactive," May 7, 2002 (smh.com.au/aricles/2002/05/06/1019441476548. html).
Partial European Search Report dated Feb. 20, 2008 for EP 07250853.
Alvarez, J. et. al., "Characterization and Deactivation Studies of an Activated Sulfided Red Mud Used as Hydrogenation Catalyst," Applied Catalysis A: General, Elsevier Science, vol. 167, No. 2, (Feb. 27, 1998).
Database Compendex [Online] Engineering Information, Inc., Forssberg K. S. E. et al., "Adsorption of Heavy Metal Ions on Pyrrhotite," & SCAND J. Metall 1981, vol. 10, No. 5, 1981, pp. 225-230.
Gupta V. K. et al., "Process development for the removal of lead and chromium from aqueous solutions using red mud—an aluminium industry waste," Water Research, Elsevier, Amsterdam, NL, vol. 35, No. 5, Apr. 2001, pp. 1125-1134.
Bertocchi et al., "Red mud and fly ash for remediation of mine sites contaminated with As, Cd, Cu, Pb and Zn," Journal of Hazardous Materials, Elsevier, vol. 134, No. 1-3, Dec. 1, 2005, pp. 112-119.
Database WPI Week 199604, Derwent Publications Ltd., London, GB: An 1996-038394 & RU 2035977C1 (Gorenbein A. E.) May 27, 1995.
Lopez E. et al., "Adsorbent properties of red mud and its use for wastewater treatment," Water Research, Elsevier, Amsterdam, NL, vol. 32, No. 4, Apr. 1998, pp. 1314-1322.
Danis et al., "Chromate removal from water using red mud and crossflow microfiltration," Desalination, Elsevier, Amsterdam, NL, vol. 181, No. 1-3, Sep. 5, 2005, pp. 135-143.
Han Jingtai: "Arsenic removal from water by iron-sulphide minerals" Chinese Science Bulletin, vol. 45, No. 15, Aug. 2000, pp. 1430-1434.
European Search Report for EP 07 25 0853 completed Apr. 29, 2008.
Gao, A. J.; Meyn S; Oelert H.H. May 14, 1993, Source: Erdoel & Kohle, Erdgas, Petrochemie (1993), 46(2), 61-5 CODEN: EKEPAB; ISSN: 0014-0048; English.
Lopez et al., "Adsorbent properties of red mud and its use for wastewater treatment," 1998, Wat. Res., vol. 32, pp. 1314-1332.

* cited by examiner

*Primary Examiner* — Kaj K Olsen
*Assistant Examiner* — Pritesh Darji
(74) *Attorney, Agent, or Firm* — Kenneth E. Darnell

(57) ABSTRACT

Toxic substances such as heavy metals are extracted from a medium using a sorbent composition. The sorbent composition is derived by sulfidation of red mud, which contains hydrated ferric oxides derived from the Bayer processing of bauxite ores. Exemplary sulfidizing compounds are $H_2S$, $Na_2S$, $K_2S$, $(NH_4)_2S$, and $CaS_x$. The sulfur content typically is from about 0.2 to about 10% above the residual sulfur in the red mud. Sulfidized red mud is an improved sorbent compared to red mud for most of the heavy metals tested (Hg, Cr, Pb, Cu, Zn, Cd, Se, Th, and U). Unlike red mud, sulfidized red mud does not leach naturally contained metals. Sulfidized red mud also prevents leaching of metals when mixed with red mud. Mixtures of sulfidized red mud and red mud are more effective for sorbing other ions, such as As, Co, Mn, and Sr, than sulfidized red mud alone.

23 Claims, No Drawings

METHOD AND COMPOSITION FOR SORBING TOXIC SUBSTANCES

CROSS REFERENCE TO RELATED APPLICATIONS

This application is a division of U.S. application Ser. No. 12/537,907, filed Aug. 7, 2009, now U.S. Pat. No. 7,807,058, which is a division of U.S. application Ser. No. 11/277,282, filed Mar. 23, 2006, now U.S. Pat. No. 7,763,566, the disclosures of which are hereby incorporated hereinto by reference.

FIELD OF THE INVENTION

The present invention is directed to sorbents for heavy metals and their use for facile extraction of heavy metals from liquid and gaseous streams, as well as removal of the sorbed heavy metals by solids/fluid separation means.

DESCRIPTION OF RELATED ART

Heavy metal contaminated flue gases and liquids from various sources (ground, stream, runoff, mines, petroleum, industrial waste) are among the most dangerous and difficult environmental problems facing the world today. An especially serious problem is posed by toxic metals in such streams. Among these metals are mercury, chromium, cobalt, nickel, copper; zinc, silver, gold, cadmium, lead, selenium, and transuranic elements.

Mercury contamination of the environment is the subject of increasing attention because it eventually accumulates at very high levels in the bodies of large predatory fish such as tuna, swordfish, and sharks. A major concern is the atmospheric release of mercury from coal fired power plants, currently estimated at 46 tons per year in the United States. The Environmental Protection Agency (EPA) has identified women of childbearing age as especially threatened because of possible neurological damage to unborn children. It is estimated that 8% of women in this category have a methyl mercury blood level above 5.8 ppb.

On Dec. 14, 2000, the EPA issued a determination that their agency must propose new regulations under the Clean Air Act to control mercury emissions from coal and oil fined power plants by Dec. 15, 2003. One proposal was to reduce mercury emissions from power plants by 90% by 2007. According to an article in Forbes (Apr. 14, 2003, page 104) such regulation "could cost the power industry at least 8.8 billion dollars per year." Other, more recent proposals such as the Clear Skies Act call for a 70% reduction in mercury emissions over 15 years.

At present, a major control technology for mercury is the use of activated carbon treatment of flue gases from power plants. Activated carbon currently sells for about 45 cents per pound ($ 900 per ton) but the disposal or possible regeneration of mercury-sorbed activated carbon presents unresolved problems at this time.

Red mud is an undesirable by-product and major pollutant from the Bayer Process. Bayer caustic leaching of bauxite is the principal process for production of alumina. This process relies on the solubility of aluminous minerals in hot (e.g., 125-250° C.) sodium hydroxide solution and the insolubility of most of the remaining minerals (iron, titanium compounds and silica), which are either insoluble or react and re-precipitate. The insoluble, iron rich residue byproduct is known as "red mud." Red mud can contain from about 17.4 to 37.5% iron (Fe) (Bauxite Residue Fractionation with Magnetic Separators, D. William Tedder, chapter 33, Bauxite symposium, 1984, AIME 1984). Red mud is a complex mixture of finely divided hydrated iron oxides with a wide variety of lesser minerals (Al, Na, Ti, Si, Ca, Mg) and traces of over a score of other elements (Cr, Ni, Zn, Pb, As, etc). These hydrous iron oxides have extraordinary sorptive and complexing properties.

Red mud is a very hydrophilic, high pH slime which is extremely difficult to dewater by filtration or sedimentation means. This complicates and limits its utility as a sorbent in aqueous systems.

Red mud has been proposed as a sorbent for heavy metals, cyanides, phosphates, and the like (David McConchie, Virotec website: virotec.com/global.htm). However, the sorptive and release properties of red mud are not always complementary. Depending on the source of a particular red mud, it can also leach out significant amounts of toxic pollutants such as radioactive thorium, uranium, chromium, barium, arsenic, copper, zinc, cobalt, as well as lead, cadmium, beryllium, and fluorides.

The potential problems involved with use of red mud to control pollution are highlighted in an e-newsletter article entitled "The Great Red Mud Experiment that Went Radioactive"—Gerard Ryle, May 7, 2002 (smh.com.au/articles/2002/05/06/1019441476548.html). This experiment conducted by the Western Australian Agricultural Department involved placing 20 tonnes of Alcoa red mud per hectare on farmland in order to stop unwanted phosphorous from entering waterways. An unintended result of this application was that runoff waters showed excessive quantities of copper, lead, mercury, arsenic, and selenium. Emaciated cattle grazing on such land exhibited high chromium, cadmium, and fluoride levels. Each hectare contained up to 30 kilograms of radioactive thorium. The disastrous red mud application test was abruptly terminated after five years.

It is therefore evident that extreme caution must be exercised in selecting and testing red mud before attempting to use it to sorb toxic compounds.

Furthermore, the capacity of red mud to capture and hold toxic substances such as mercury and related metals is not adequate to eliminate traces of these metals in leachate. The possibility also exists that sorption of one toxic pollutant may release other pollutants. As a result, use of red mud as a sorbent to achieve drinking water standards can be problematic.

There remains a need for improved sorbents for extracting toxic compounds such as mercury and other heavy metals.

SUMMARY OF THE INVENTION

The present invention, according to one aspect, is directed to a sorbent comprising the reaction product of a sulfidizing compound and red mud. Red mud contains hydrated ferric oxides derived from Bayer processing of bauxitic ores. The sorbent is particularly useful for sorbing toxic substances from a medium, such as heavy metals present in a liquid or gaseous stream. Exemplary sulfidizing compounds include $H_2S$, $Na_2S$, $K_2S$, $(NH_4)_2S$, and $CaS_x$. The sulfur content of the reaction product typically is from about 0.2 to about 10% above the residual sulfur in the red mud.

According to one aspect of the invention, portable water (e.g., meeting drinking water standards) is prepared by treating contaminated water with a sulfidized red mud sorbent.

According to another aspect of the invention, heavy metals such as mercury are sorbed from flue gases of coal- or oil-fired power plants by treating the flue gases with a sulfidized red mud sorbent.

According to another aspect of the invention, heavy metals are sorbed from mine drainage waters by treating the mine drainage waters with a sulfidized red mud sorbent.

According to yet another aspect of the invention, heavy metals are sorbed from a hydrocarbon stream, such as a petroleum stream, by treating the stream with a sulfidized red mud sorbent.

The sorbent of the present invention is effective for sorbing various contaminants, such as mercury, which are not effectively sorbed by red mud. Conversely, red mud is effective for sorbing other contaminants, such as arsenic, which are not effectively sorbed by the sulfidized red mud sorbent. Thus, some treatments can benefit by using both red mud and sulfidized red mud, either in the same sorbent composition or in separate treatment stages. Such sorbent combinations potentially can allow for the extraction of a wider range of contaminants.

DETAILED DESCRIPTION OF THE INVENTION

The present invention has applicability in removing contaminants from a wide variety of mediums, non-limiting examples of which include flue gases and liquids from various sources such as groundwater, water streams, runoff, mines, petroleum streams, and industrial waste streams. Of particular interest is sorbing heavy metals, such as mercury (Hg), chromium (Cr), lead (Pb), copper (Cu), zinc (Zn), silver (Ag), gold (Au), cadmium (Cd), selenium (Se), thorium (Th), and uranium (U), from such mediums. The metal(s) may be present as ions, as free elements, or in compounds with other elements.

The sorbents of the present invention can be used for the preparation of portable water, e.g., meeting drinking water standards. Other exemplary applications include sorbing heavy metals, such as mercury, from flue gases of coal- or oil-fired power plants, mine drainage waters, or hydrocarbon streams such as petroleum streams.

The sorbent can be prepared by the sulfidation of red mud, which contains hydrated ferric oxides derived from the Bayer processing of bauxitic ores. Sulfidation can be achieved by reacting the red mud with one or more sulfidizing compounds such as $H_2S$, $Na_2S$, $K_2S$, $(NH_4)_2S$, and $CaS_x$. Unlike red mud, which is very hydrophilic, the sulfidized red mud is lyophobic and more readily dewatered. As a result, sulfidized red mud exhibits significantly faster filtration rates than those exhibited by red mud.

The relative amount of the sulfidizing compound preferably is selected so that the sulfur content of the reaction product is from about 0.2 to about 10% above the residual sulfur content of the red mud. The weight ratio of sulfidizing compound to red mud will vary on the type of sulfidizing compound used and the desired level of sulfidation for a particular end use. Most often, the sulfidizing compound and red mud are combined at a weight ratio of from about 1:40 to about 1:4, more usually from about 1:25 to about 1:6, and even more usually from about 1:20 to about 1:8.

The conditions under which the red mud can be sulfidized depend on such factors as the identity of the sulfidizing compound(s) and the intended use of the resulting sorbent. In some cases, sulfidation can be accomplished by mixing red mud and the sulfidizing compound at ambient temperature and atmospheric pressure. In general, higher sulfur contents can be obtained when the reaction is carried out at elevated temperatures and/or elevated pressures. Sulfur content in the reaction product also can be influenced by factors such as the sulfur content of the sulfidizing agent. For example, compounds with higher sulfur contents, such as calcium polysulfide, typically yield products having higher sulfur contents.

When using gaseous sulfidizing compounds, such as hydrogen sulfide ($H_2S$), it is often preferable to conduct the reaction at elevated temperature and/or elevated pressure to increase the rate of reaction and the sulfur content of the resulting sorbent. Suitable exemplary reaction temperatures range from about 40 to about 200° C., often from about 80 to about 120° C. The reaction pressure typically ranges from about 1 to about 225 psi, often from about 30 to about 70 psi (absolute).

In one embodiment of the present invention, the sorbent is slurried together with the medium containing the contaminant(s) to be extracted. Suitable mixing equipment can be used to provide sufficient contact between the sorbent and the contaminant(s). The sorbent, which forms a complex with the contaminant(s), can then be separated from the slurry using one or more conventional techniques such as filtration, sedimentation, or centrifugation.

In an alternative embodiment of the present invention, the sulfidized red mud sorbent is processed into pellets or the like using conventional pelletizing or extrusion equipment. Preparing the sorbent in pellet form can simplify its handling and/or use. The pellets may be incorporated into filters of conventional construction for use in a variety of industrial or consumer filtration applications, such as filters usable for preparing portable water.

It has been found that the sulfidized red mud sorbent is effective for sorbing various contaminants, such as mercury, which are not effectively sorbed by red mud. On the other hand, red mud is effective for sorbing other contaminants, such as arsenic, which are not effectively sorbed by sulfidized red mud. For the treatment of mediums having contaminants in both of these categories, the use of red mud and sulfidized red mud in tandem, either in the same sorbent composition or in sequential treatment stages (e.g., red mud followed by sulfidized red mud) can be more effective than using either sorbent alone.

EXAMPLES

Example 1

This example shows the preparation of red mud. A 1 kg sample of red mud received from Sherwin Alumina Company of Corpus Christi, Tex. was slurried at 15% solids in demineralized water and filtered on a Buchner funnel. The resulting filter cake was re-slurried with demineralized water, re-filtered, and used as the starting material in Example 2.

Example 2

This example illustrates the preparation of sulfidized red mud using hydrogen sulfide ($H_2S$). Washed red mud (100 g) from Example 1 was slurried in demineralized water at 15% solids and the stirred slurry was saturated with hydrogen sulfide for 30 minutes at ambient temperature. The sample was dried overnight at 100° C. and the resulting cake was pulverized.

Example 3

This example shows the preparation of sulfidized red mud using $H_2S$ under pressure in a Parr Bomb. The sulfidation procedure of Example 2 was repeated using a Laboratory Parr Bomb. After saturation of the slurry with hydrogen sulfide gas, the bomb was sealed and heated four hours at 100° C.

while stirred. The bomb was then cooled, depressurized and the contents filtered, dried, and pulverized.

Example 4

This example illustrates the preparation of sulfidized red mud using ammonium sulfide $(NH_4)_2S$. Red mud (200 g) was dispersed in 600 grams of deionized (DI) water in a Waring Blender for 5 minutes. Ammonium sulfide (10 g) was added and the slurry was heated with stirring on a hot plate for 1 hr. at 60° C. It was then filtered and dried at 90° C.

Example 5

This example shows the preparation of sulfidized red mud using sodium sulfide $(Na_2S)$. The procedure of Example 2 was repeated using sodium sulfide instead of ammonium sulfide.

Example 6

This example illustrates the preparation of sulfidized red mud using calcium polysulfide $(CaS_x)$. The procedure of Example 2 was repeated using 33.5 g of 30% solution of Cascade calcium polysulfide.

Example 7

The following table summaries the sulfur content of the red mud (RM) of Example 1 and the sulfidized red mud (SRM) of Examples 2, 3, 4, 5, and 6.

| Code | Description | Example | S (wt %) |
|---|---|---|---|
| RM | Red Mud | 1 | 0.19 |
| SRM-2 | Sulfidized Red Mud $H_2S$ | 2 | 0.48 |
| SRM-3 | Sulfidized Red Mud $H_2S$ w/Pressure | 3 | 0.90 |
| SRM-4 | Sulfidized Red Mud $(NH_4)_2S$ | 4 | 0.46 |
| SRM-5 | Sulfidized Red Mud $Na_2S$ | 5 | 0.62 |
| SRM-6 | Sulfidized Red Mud $CaS_x$ | 6 | 1.19 |

A complete analysis of RM, SRM-3, SRM-4, SRM-5, SRM-6 is given in Table A below. The analysis reveals that filtration and washing during preparation of sulfidized red mud extracts sodium chloride (except for SRM-5) and reduces bound water in the red mud. It is notable that very small amounts of reacted sulfur have such a profound effect on the chemical and physical properties of red mud.

TABLE A

| | | \multicolumn{12}{c}{Weight %} |
|---|---|---|---|---|---|---|---|---|---|---|---|---|---|
| Code | Description | $Na_2O$ | MgO | $Al_2O_3$ | $SiO_2$ | $P_2O_5$ | S | Cl | $K_2O$ | CoO | $TiO_2$ | MnO | $Fe_2O_3$ | BaO |
| RM | Control | 4.73 | 0.12 | 17.1 | 8.23 | 1.14 | 0.19 | 0.20 | 0.06 | 6.79 | 6.12 | 0.73 | 39.9 | 0.02 |
| SRM-3 | $H_2S$ (b) | 3.94 | 0.14 | 14.6 | 9.14 | 1.38 | 0.90 | 0.11 | 0.05 | 6.36 | 6.79 | 0.90 | 46.2 | 0.02 |
| SRM-4 | $(NH_4)_2S$ | 4.39 | 0.13 | 17.9 | 9.24 | 1.26 | 0.46 | 0.15 | 0.04 | 8.82 | 6.95 | 0.85 | 42.3 | 0.02 |
| SRM-5 | $Na_2S$ | 5.20 | 0.11 | 17.2 | 8.56 | 1.15 | 0.62 | 0.15 | 0.03 | 7.53 | 6.22 | 0.75 | 41.5 | 0.02 |
| SRM-6 | $CaS_x$ | 4.44 | 0.09 | 16.2 | 8.41 | 1.29 | 1.19 | 0.14 | 0.04 | 9.32 | 6.60 | 0.81 | 41.2 | 0.02 |

| | | \multicolumn{12}{c}{PPM} |
|---|---|---|---|---|---|---|---|---|---|---|---|---|
| Code | Description | V | Cr | Co | Ni | W | Cu | Zn | As | Sn | Pb | Mo | Sr | U |
| RM | Control | 1100 | 1258 | 99 | 680 | 16 | 119 | 416 | 47 | 247 | 144 | <10 | 424 | 65 |
| SRM-3 | $H_2S$ (b) | 1252 | 1506 | 121 | 860 | 23 | 138 | 458 | 44 | 177 | 180 | <10 | 498 | 57 |
| SRM-4 | $(NH_4)_2S$ | 1093 | 1379 | 120 | 762 | 30 | 146 | 648 | 46 | 155 | 176 | 13 | 447 | 36 |
| SRM-5 | $Na_2S$ | 942 | 1272 | 103 | 695 | 24 | 130 | 504 | 31 | 181 | 159 | 11 | 387 | 39 |
| SRM-6 | $CaS_x$ | 1054 | 1364 | 113 | 780 | 29 | 138 | 471 | 49 | 155 | 165 | 13 | 431 | 50 |

| | | \multicolumn{5}{c}{PPM} |
|---|---|---|---|---|---|---|
| Code | Description | Th | Nb | Zr | Rb | Y |
| RM | Control | 186 | 188 | 1757 | 24 | 673 |
| SRM-3 | $H_2S$ (b) | 199 | 207 | 1503 | 21 | 831 |
| SRM-4 | $(NH_4)_2S$ | 159 | 153 | 1888 | <10 | 748 |
| SRM-5 | $Na_2S$ | 123 | 148 | 1659 | <10 | 695 |
| SRM-6 | $CaS_x$ | 146 | 146 | 1767 | <10 | 745 |

Example 8

This example illustrates leaching of red mud and sulfidized red mud. In part (a), a slurry of red mud (50 g) and demineralized water (450 ml) was prepared, mixed for 30 minutes, and filtered. The filtrate was acidified with 2 ml concentrated nitric acid and analyzed by ICP using EPA3050 and EPA6010 methods.

In part (b), the procedure of part (a) was repeated using sulfidized red mud from Example 2.

Results are given in Table I and show that leachate from sulfidized red mud (SRM) gave a lower content of heavy metals (low parts per billion) than leachate from the red mud (RM) in every case except Cd, where the difference was insignificant.

TABLE I

| | Metal Concentration in Leachate (ppm) | | | | | |
|---|---|---|---|---|---|---|
| | Hg | As | Cd | Cr | Pb | Se |
| SRM | 0.0026 | ND* | 0.0013 | 0.0044 | ND | ND |
| RM | 0.0032 | 0.096 | ND | 0.0510 | 0.0064 | 0.017 |

*ND - Not detectable, below limits

Example 9

This example shows mercuric ion (3.5 ppm) sorption by sulfidized red mud. Ten grams of sulfidized red mud from Example 3 was slurried 30 minutes with 1 kg demineralized water containing 3.5 ppm mercury (5.66 ppm mercuric nitrate). The slurry was filtered and analyzed for mercury ($Hg^{++}$) by ICP (Method EOA 245.1).

Example 10

This example illustrates mercuric ion (3.5 ppm) sorption by red mud. Example 9 was repeated using red mud.

Example 11

This example shows mercuric ion (22 ppm) sorption by sulfidized red mud. Example 9 was repeated using 22 ppm mercury ($Hg^{++}$).

Example 12

This example illustrates mercuric ion (22 ppm) sorption by red mud. Example 11 was repeated using red mud.

Example 13

This example shows mercuric ion (41 ppm) sorption by sulfidized red mud. Example 9 was repeated using 41 ppm mercury ($Hg^{++}$).

Example 14

This example illustrates mercuric ion (41 ppm) sorption by red mud. Example 13 was repeated using red mud.

Results of Examples 9-14 are summarized in Table II and demonstrate the superior performance of sulfidized red mud compared to red mud for sorption of mercuric ion from aqueous solutions.

TABLE II

| Example | Mercuric Concentration In Filtrate | Sorbent |
|---|---|---|
| Control | 3.5 ppm | none |
| 9 | 0.56 ppm | red mud |
| 10 | 0.2 ppm | sulfidized red mud |
| Control | 22.0 ppm | none |
| 11 | 8.0 ppm | red mud |
| 12 | 0.22 ppm | sulfidized red mud |
| Control | 41.0 ppm | none |
| 13 | 23.4 ppm | red mud |
| 14 | 0.04 ppm | sulfidized red mud |

Example 15

This example shows mercury (metal) sorption from vapor phase by sulfidized red mud and by red mud (spray absorbed). In part (a), one gram of mercury metal was placed in a two necked round bottom (RB) flask on a supported heating mantle. One neck of the flask was open and the second neck was connected with a Teflon® tube to an aperture in the inlet duct of a spray dryer. The mercury was heated to 300° C. while hot air was aspirated through the vessel. Mercury vapor was entrained in the air as it was drawn into the inlet air duct of the spray dryer heated to 300° C. A slurry of 50 g SRM (Example 3) in 450 ml demineralized water was sprayed by a rotary atomizer operating at 30,000 rpm. The feed rate of SRM was regulated to produce an outlet temperature of 100° C. from the dryer.

In part (b), the procedure of part (a) was repeated using RM (Example 1) instead of SRM.

The mercury content of the spray dried SRM from part (a) and the RM from part (b) are tabulated in Table III and demonstrate that the SRM had a significantly improved sorption of mercury.

TABLE III

| | Hg Concentration (ppm) |
|---|---|
| 15(a) SRM-3 | 61.0 |
| 15(b) RM-1 | 8.1 |

SRM-3 absorbed 7.5 times as much mercury as RM-1 when spray dried at 300° C. inlet and 100° C. outlet in the presence of an air stream contacted by mercury heated to 250° C. Sulfidized red mud is significantly superior to red mud as a sorbent for elemental mercury metal vapor.

Example 16

This example shows mercury (metal) sorption from vapor phase by sulfidized red mud and by red mud (spray absorbed). Example 15 was repeated except that a slurry of 100 g SRM in 900 ml demineralized water was used. On completion of drying, a 50 g sample (a) was set aside for analysis and 50 g was re-slurried in 450 ml demineralized water and re-dried (b). Samples 16a and 16b were analyzed for mercury.

This experiment was then repeated using 100 g RM to furnish samples 16c and 16d, which were analyzed. The results of parts (a)-(d) are shown in Table IV below.

TABLE IV

|  |  | Hg Concentration (ppm) |
| --- | --- | --- |
| 16(a) SRM-3 | 1st pass | 95 |
| 16(b) SRM-3 | 2nd pass | 340 |
| 16(c) RM-1 | 1st pass | 43 |
| 16(d) RM-1 | 2nd pass | 48 |

As evident from Table IV, SRM-3 was about twice as efficient as RM-1 on the 1st pass and about seven times as efficient as RM-1 on the second pass. The results show that the affinity of SRM-3 for mercury improves with increased exposure to mercury, indicating an induction effect.

Example 17

This example illustrates mercury (metal) sorption from vapor phase by sulfidized red mud (a) and red mud (b) using a column. In part (a), one gram of mercury was placed in a two necked RB flask supported on a heating mantle. One neck of the flask was open (vented) and the second neck was connected to a vertical tube 20 cm long and 2.5 cm diameter half filled with spray dried sulfidized red mud. A slight vacuum was applied to the open end of the packed tube and regulated to fluidize the spray dried sulfidized red mud while the mercury in the flask was heated to 300° C. The aspiration was continued for 20 minutes, the tube was disconnected from the RB flask and the sulfidized red mud contents analyzed for mercury by ICP.

In part (b), the procedure of part (a) was repeated using spray dried red mud, after which the red mud was also submitted for mercury analysis by ICP.

Results of the above experiment are tabulated in Table V and demonstrate increased sorption of mercury vapor by sulfidized red mud (SRM-3) compared to red mud (RM-1).

TABLE V

|  | Hg Concentration (ppm) |
| --- | --- |
| 17(a) SRM-3 | 72 |
| 17(b) RM-1 | 25 |

Example 18

This example shows sorption of mercury (metal) from naphtha by sulfidized red mud (a) and red mud (b). In part (a), a solution of 500 ml naphtha containing 100 ppb of mercury was slurried with 10 grams of spray dried sulfidized red mud (SRM) for 30 minutes. The resulting slurry was filtered, and the SRM filter cake was dried for 1 hour at room temperature and analyzed for mercury by ICP.

In part (b), the procedure of part (a) was repeated using red mud (RM).

Results of parts (a) and (b) are shown in Table VI and reveal the increased capture of mercury from naphtha by sulfidized red mud (SRM-3).

TABLE VI

|  | Mercury (ppb) |
| --- | --- |
| 18(a) SRM-3 filtrate | 46 |
| 18(b) RM-1 filtrate | 21 |

Example 19

This example shows sorption of chromium (III) by sulfidized red mud (SRM) and red mud (RM). In part (a), ten grams of SRM was slurried 30 minutes with 1 kg demineralized water containing 2.240 ppm chromium III. The slurry was filtered and the filtrate analyzed for chromium by EPA 200.9 method.

In part (b), the procedure of part (a) was repeated using 2.240 ppm chromium III and red mud (RM). The results are shown in Table VII below.

TABLE VII

|  | Chromium III (ppm) |
| --- | --- |
| Control | 2.240 |
| 19(a) SRM-3 filtrate | 0.005 |
| 19(b) RM-1 filtrate | 0.018 |

Results shown in Table VII demonstrate improved sorption of Chromium III by SRM-3 compared to RM-1.

Example 20

This example illustrates sorption of cobalt (II) by sulfidized red mud (SRM) and by red mud (RM). The procedures of Examples 19 (a) and (b) were repeated using 2.75 ppm of cobalt II. The results are shown in Table VIII below.

TABLE VIII

|  | Cobalt II (ppm) |
| --- | --- |
| Control | 2.75 |
| 20(a) SRM-3 filtrate | 0.013 |
| 20(b) RM-1 filtrate | 0.046 |

Results in Table VIII show that SRM-3 has greater affinity for cobalt II than RM-1, with the filtrate from SRM-3 containing less than ⅓ of cobalt II than that contained in the filtrate from RM-1.

Example 21

This example shows sorption of nickel (II) by sulfidized Red Mud (SRM) and by red mud (RM). The procedures of Examples 15(a) and (b) were repeated using 1.13 ppm nickel (II). The results are shown in Table IX below.

TABLE IX

|  | Nickel II (ppm) |
| --- | --- |
| Control | 1.13 |
| 21(a) SRM-3 filtrate | 0.056 |
| 21(b) RM-1 filtrate | 0.009 |

The results show nickel removal by SRM-3 was less efficient than by RM-1.

Example 22

This example illustrates sorption of copper (II) by sulfidized red mud (SRM-3) and by red mud (RM-1). The procedures of Examples 19 (a) and (b) were repeated using 1.550 ppm, 6.250 ppm, and 30.500 ppm copper (II). The results are shown in Table X below.

TABLE X

|  | Copper II (ppm) |
| --- | --- |
| Control A | 1.550 |
| 22(a) SRM-3 filtrate | <0.004 |
| 22(b) RM-1 filtrate | 0.028 |
| Control B | 6.250 |
| 22(c) SRM-3 filtrate | 0.038 |
| 22(d) RM-1 filtrate | 0.054 |
| Control C | 30.500 |
| 22(e) SRM-3 filtrate | 0.040 |
| 22(f) RM-1 filtrate | 0.073 |

The results show a clear advantage of SRM-3 over RM-1 for copper removal over a 15-fold range of copper concentrations.

Example 23

This example shows sorption of zinc (II) by sulfidized red mud (SRM) and by red mud (RM). The procedures for Examples 15(a) and (b) were repeated using 1.850 ppm zinc (II) and 2.380 ppm zinc (II). The results are shown in Table XI below.

TABLE XI

|  | Zinc II (ppm) |
| --- | --- |
| Control A | 1.850 |
| 23(a) SRM-3 filtrate | 0.009 |
| 23(b) RM-1 filtrate | 0.035 |
| Control B | 2.380 |
| 23(c) SRM-3 filtrate | 0.022 |
| 23(d) RM-1 filtrate | 0.103 |

The results show SRM-3 is superior to RM-1 for zinc removal and yields filtrates with about one-fourth the concentration of zinc.

Example 24

This example illustrates sorption of silver (I) by sulfidized red mud (SRM). The procedure of Example 15(a) was repeated using 3.15 ppm silver (I). The results are shown in Table XII below.

TABLE XII

|  | Silver I (ppm) |
| --- | --- |
| Control | 3.15 |
| 24(a) SRM-3 filtrate | N.D. |

The results demonstrate that SRM-3 is a good sorbent for silver ion.

Example 25

This example shows sorption of gold I by sulfidized red mud (SRM). The procedure of Example 19 (a) was repeated using 0.703 ppm gold III. The results are shown in Table XIII below.

TABLE XIII

|  | Gold III (ppm) |
| --- | --- |
| Control | 0.703 |
| 25(a) SRM-3 filtrate | 0.227 |

The results demonstrate that SRM-3 is a good sorbent for gold (III).

Example 26

This example illustrates sorption of cadmium II by sulfidized red mud (SRM) and by red mud (RM). The procedures of Examples 19 (a) and (b) were repeated using 1.850 ppm cadmium. The results are shown in Table XIV below.

TABLE XIV

|  | Cadmium II (ppm) |
| --- | --- |
| Control | 1.850 |
| 26(a) SRM-3 filtrate | 0.009 |
| 26(b) RM-1 filtrate | 0.035 |

The results show that SRM-3 is significantly more efficient in removing cadmium II from water than is RM-1.

Example 27

This example shows sorption of lead ion $^{+}2$ by sulfidized red mud (SRM) and by red mud (RM). The procedures of Examples 19 (a) and (b) were repeated using 2 ppm lead ion ($^{+}2$). The results are shown in Table XV below.

TABLE XV

|  | Lead II (ppm) |
| --- | --- |
| Control | 2.0 |
| 27(a) SRM-3 filtrate | 0.007 |
| 27(b) RM-1 filtrate | 0.058 |

The results show that SRM-3 reduced lead content to about one-eighth of the content achieved by RM-1. The lead content of the SRM filtrate (7 ppb) met drinking water standards (currently 15 ppb).

Example 28

This example shows sorption of selenium by sulfidized red mud (SRM) and red mud (RM). The procedures of Examples 19 (a) and (b) were repeated using 2.5 ppm selenium. The results are shown in Table XVI below.

TABLE XVI

|  | Selenium (ppm) |
| --- | --- |
| Control | 2.5 |
| 28(a) SRM-3 filtrate | 0.24 |
| 28(b) RM-1 filtrate | 2.10 |

The results show that SRM-3 reduced Se by about 90% while RM-1 only reduced Se by about 16%.

Example 29

This example illustrates sorption of uranium by sulfidized red mud (SRM-3) and red mud (RM-1). The procedures of Examples 19(a) and (b) were repeated using a Uranium Atomic Absorption Standard Solution containing 1000 micrograms of U (as uranyl nitrate—$UO_2(NO_3)_2$) and made up in varying concentrations (1.13, 10.1, and 38.0 ppm), and then treated with sulfidized red mud (SRM-3) and red mud (RM-1). In addition, a third test was performed on each uranium solution using a mixture of 5 g sulfidized red mud (SRM-3) and 5 g red mud (RM-1). The results are shown in Table XVII below.

TABLE XVII

|  | Uranium (ppm) |
| --- | --- |
| Control A | 1.13 |
| 29(a) SRM-3 filtrate | 0.040 |
| 29(b) RM-1 filtrate | 0.074 |
| 29(c) RM-1/SRM-3 | 0.031 |
| Control B | 10.1 |
| 29(d) SRM-3 filtrate | 0.494 |
| 29(e) RM-1 filtrate | 2.450 |
| 29(f) SRM-3/RM-1 filtrate | 1.610 |
| Control C | 38.0 |
| 29(g) SRM-3 filtrate | 3.950 |
| 29(h) RM-1 filtrate | 6.900 |
| 29(i) SRM-3/RM-1 filtrate | 4.660 |

The data in Table XVII (29(f)-(i)) confirm that sulfidized red mud is significantly more efficient for extraction of uranium than is red mud. Moreover, combinations of sulfidized red mud and red mud (1:1) are more effective than red mud alone. The combination of SRM and RM allows the complimentary extraction of elements while eliminating the leaching of other elements from RM.

Table XVIII below summarize the results of Examples 19-27. The last column indicates the amount (in wt %) of the target material that was removed by SRM.

TABLE XVIII

| Example | Element | Control (ppm) | RM (ppm) | SRM (ppm) | % Removed by SRM |
| --- | --- | --- | --- | --- | --- |
| 19 | Chromium III | 2.240 | 0.018 | 0.005 | 99.997 |
| 20 | Copper II | 1.550 | 0.028 | <0.004 | 99.997 |
|  | Copper II | 6.250 | 0.054 | 0.038 | 99.993 |
|  | Copper II | 30.500 | 0.073 | 0.040 | 99.999 |
| 21 | Zinc II | 1.850 | 0.035 | 0.009 | 99.995 |
|  | Zinc II | 2.380 | 0.103 | 0.022 | 99.990 |
| 22 | Silver I | 3.15 | ND* | ND | 99.999 |
| 23 | Gold I | 0.703 | ND | 0.227 | 67.7 |
| 24 | Cadmium II | 1.850 | 0.035 | 0.009 | 99.995 |
| 25 | Lead II | 2.0 | 0.058 | 0.007 | 99.996 |
| 26 | Selenium | 2.5 | 2.1 | 0.24 | 99.904 |
| 27 | Uranium II | 1.13 | 0.074 | 0.04 | 99.964 |
|  | Uranium II | 10.1 | 2.45 | 0.494 | 99.951 |
|  | Uranium II | 38.0 | 6.90 | 3.95 | 99.896 |

*ND = not detectable

Example 30

This example compares SRM and RM for sorption of As, Co, Mn, and Sr. The procedure of Example 9 was repeated using solutions of arsenic (III), arsenic (V), cobalt II, manganese (II), and strontium (I), with results summarized in Table XIX.

TABLE XIX

| Element | Control (ppm) | RM-1 ppm | % Removed | SRM-3 Ppm | % Removed |
| --- | --- | --- | --- | --- | --- |
| Arsenic III | 0.60 | 0.11 | 81.7 | 0.36 | 60.0 |
| Arsenic V | 1.60 | 0.21 | 87.8 | 1.15 | 72.0 |
| Cobalt II | 2.75 | 0.013 | 99.5 | 0.046 | 98.3 |
| Manganese II | 1.63 | 0.135 | 91.7 | 0.548 | 66.4 |
|  | 2.10 | 0.72 | 65.7 | 0.792 | 37.7 |
| Strontium II | 1.90 | 0.10 | 94.7 | 1.10 | 42.1 |
|  | 9.0 | 0.08 | 99.1 | 4.60 | 48.9 |
|  | 27.0 | 0.19 | 99.3 | 11.0 | 59.2 |

These experiments reveal that the efficiency of red Mud (RM-1) is significantly better than SRM-3 in the case of As (III), As (V), Mn (II), and Sr (II). However, the use of red mud as a sorbent is limited by the leaching of undesirable elements which can and have caused serious problems. Use of sulfidized red mud in combination with red mud allows utilization of the latter because sulfidized red mud sorbs undesirable leaching of extraneous metals from red mud itself.

Example 31

This example shows sorption of Hg (II) by various sulfidized red muds, as summarized in Table XX below.

TABLE XX

| Concentration of Hg (II) in Leachate (ppm) | | | | | | | | |
| --- | --- | --- | --- | --- | --- | --- | --- | --- |
| Concentration of Hg (II) in Original solution (ppm) | SRM-4 5% $(NH_4)_2S$ | % Removed | SRM-5 5% $Na_2S$ | % Removed | SRM-6 5% $CaS_x$ | % Removed | SRM-3 $H_2S$ pressure | % Removed |
| 4.5 | 0.001 | 100 | 0.449 | 90.0 | 0.005 | 99.9 | 0.004 | 99.9 |
| 19.6 | 0.0229 | 99.9 | 15.4 | 21.4 | 3.16 | 83.8 | 0.02 | 99.9 |

Each of SRM-3, -4, and -6 gave excellent sorption results from solutions of Hg (II) at two concentration (4.5 ppm and 19.6 ppm). It is significant that SRM-4 reduced Hg to 1 ppb, thus meeting current drinking water standards (2 ppb maximum). SRM-5 made form red mud by treatment with $Na_2S$ was much less efficient. Ammonium sulfide treatment (SRM-4) was the most effective sorbent despite the fact it had the lowest S content as shown by the analysis in Example 7.

Example 32

This example illustrates treating mercury metal with red mud and sulfidized red mud (wet). In part (a), a mixture of 10 g mercury metal, 50 g red mud, and 100 g demineralized water was rapidly mixed in a Waring Blender for 10 minutes. The aqueous slurry of red mud was separated from mercury in a reparatory funnel. The slurry was filtered, dried at 80° C. for 4 hours, then ground in a coffee grinder for 3 minutes, and submitted for mercury analysis.

In part (b), the procedure of part (a) was repeated using SRM-2. In part (c), the procedure of part (a) was repeated using SRM-410, which was prepared by reaction of red mud and 10% ammonium sulfide. Results for parts (a)-(c) are shown in Table XXI below.

TABLE XXI

| Example | Reagent | % Hg |
|---|---|---|
| 32(a) | RM-1/Hg | 1.27 |
| 32(b) | SRM-2/Hg | 0.55 |
| 32(c) | SRM-410/Hg | 1.65 |

The results show that sulfidized red mud SRM-410 of Example 32(c) was about 30% more effective than red mud (RM-1) in sorbing mercury.

Example 33

This example illustrates treating mercury metal with red mud and sulfidized red mud (dry). In part (a), a mixture of 10 g mercury metal and 50 g red mud was rapidly mixed in a Waring Blender for 10 minutes. Demineralized water (100 g) was added to the mixture and mixing in the blender resumed for 5 minutes. The aqueous slurry of red mud was separated from mercury in a reparatory funnel. The slurry was filtered, dried at 80° C. for 4 hours, then ground in a coffee grinder for 3 minutes, and submitted for mercury analysis.

In part (b), the procedure of part (a) was repeated using SRM-2. In part (c), the procedure of part (a) was repeated using SRM-410, which was prepared as described in Example 32 above. The results are provided in Table XXII below.

TABLE XXII

| Example | Reagent | % Hg |
|---|---|---|
| 33(a) | RM-1/Hg | 1.84 |
| 33(b) | SRM-2/Hg | 6.34 |
| 33(c) | SRM-410/Hg | 5.58 |

The results show that sulfidized red mud SRM-2 and SRM-410 sorbed over three times as much mercury than did red mud (RM-1). The sorption procedure in Example 33, which used direct contact of the sulfidized red mud and mercury (without water present initially), was much more effective than the procedure in Example 32, which initially added water to the mercury and sulfidized red mud.

Example 34

This example shows sorption of thorium (IV), as $Th(NO_3)_4.H_2O$, by RM-1 and SRM-3. In part (a), 10 g of sulfidized red mud (SRM-4) was slurried for 30 minutes with 1 kg demineralized water containing 1 ppm thorium. The slurry was filtered and analyzed for thorium.

In part (b), the procedure of part (a) was repeated using 5 ppm thorium. In part (c), the procedure of part (a) was repeated using 10 ppm thorium. In part (d), the procedure of part (a) was repeated using 20 ppm thorium. The procedures of parts (a)-(d) were then repeated using red mud. The results are summarized in Table XXIII below.

TABLE XXIII

| | Th (ppm) | | |
|---|---|---|---|
| Example | Control | SRM-4 | RM-1 |
| 34(a) | 0.956 | ND* | 0.051 |
| 34(b) | 4.930 | ND | 0.260 |
| 34(c) | 10.500 | ND | 0.564 |
| 34(d) | 19.400 | ND | 0.921 |

*ND = not detectable

The results show that sulfidized red mud SRM-4 was very effective (essentially quantitative) for thorium sorption.

Example 35

This example compares sedimentation rates of SRM-3 and RM-1. In the course of tests on metal sorption from aqueous solutions by sulfidized red mud and red mud, it was found that in all cases, sulfidized red mud exhibited significantly faster filtration rates than red mud. Red mud is very hydrophilic but conversion of red mud to sulfidized red mud transforms it to a lyophobic particle which is more readily dewatered. The unexpected improvement of dewatering behavior is shown in the following experiment:

A dispersion of 50 grams of RM-1 in 500 ml demineralized water was prepared by rapid mixing in a Waring Blender for 10 minutes. The experiment was repeated using 50 grams of SRM-3 in 500 ml demineralized water.

Both freshly prepared slurries were allowed to settle undisturbed at ambient temperature (25° C.) for a period of 72 hours. After 72 hours, the RM-1 dispersions had settled to give a clear supernatant layer of only 1 cm. The remaining slurry consisted of dispersed RM-1 with no visible sediment.

During the 72 hour period, the SRM-3 slurry completely settled to furnish a sedimentary layer about 1 cm deep and a clear supernatant layer 11.5 cm above the sediment.

These results clearly show the total alteration of surface chemistry and dewatering characteristics of red mud by relatively small degrees of sulfidation.

Example 36

Five kilograms of sulfidized red mud from Example 4 was mixed with three kilograms of water containing 50 grams of sodium silicate in a rotating spherical pelletizer (candy pan) for 30 minutes and then screened to reject and recycle plus 6 mm and minus 3 mm particles. The resulting pellets were dried for four hours at 110° C. The pellets were packed in a filter bed 60 cm deep and used to filter dilute solutions of heavy metals.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A process of extracting heavy metal ions from water comprising contacting the water with red mud and a sorbent comprising sulfidized red mud, the sulfidized red mud being a reaction product of a sulfidizing compound and red mud at a reaction temperature from ambient temperature up to about 200° C. and a reaction pressure from atmospheric pressure up to about 30 psi in aqueous solution.

2. The process of claim 1 wherein the water is contacted with a sorbent composition containing red mud and sulfidized red mud.

3. The process of claim 1 wherein the water is contacted with red mud and the sulfidized red mud sorbent in sequential stages.

4. The process of claim 1 wherein the water contains an element selected from the group consisting of Hg, Cr, Pb, Cu, Ag, Au, Cd, Se, Th, U and combinations thereof.

5. The process of claim 1 and further comprising separating the sorbent from the water using at least one of filtration, sedimentation and centrifugation.

6. The process of claim 1 wherein the sulfidizing compound is selected from the group consisting of $H_2S$, $Na_2S$, $K_2S$, $(NH_4)_2S$, $CaS_x$, and combinations thereof.

7. The process of claim 1 wherein the sulfidizing compound comprises $(NH_4)_2S$.

8. The process of claim 1 wherein the reaction product contains from about 0.2 to about 10 weight percent sulfur above residual sulfur initially present in the red mud prior to reaction with the sulfidizing compound.

9. The process of claim 1 wherein the reaction product is formed at a reaction temperature from ambient temperature up to about 60° C.

10. The process of claim 1 wherein the reaction product is formed at ambient temperature.

11. A process of treating water containing heavy metal ions, the process comprising contacting the water with a sorbent comprising sulfidized red mud, the sulfidized red mud being a reaction product of a sulfidizing compound and red mud at a reaction temperature from ambient temperature up to about 200° C. and a reaction pressure from atmospheric pressure up to about 30 psi in aqueous solution.

12. The process of claim 11, wherein the water contains an element selected from the group consisting of Hg, Cr, Pb, Cu, Zn, Ag, Au, Cd, Se, Th, U, and combinations thereof.

13. The process of claim 11 further comprising separating the sorbent from the water using at least one of filtration, sedimentation, and centrifugation.

14. The process of claim 11 wherein the water is contacted with red mud prior to contact with the sorbent comprising sulfidized red mud.

15. The process of claim 14 wherein the water is contacted with red mud and subsequently with the sulfidized red mud in sequential stages.

16. The process of claim 11 wherein the sulfidizing compound is selected from the group consisting of $H_2S$, $Na_2S$, $K_2S$, $(NH_4)_2S$, $CaS_x$, and combinations thereof.

17. The process of claim 11 wherein the sulfidizing compound comprises $(NH_4)_2S$.

18. The process of claim 11 wherein the reaction product contains from about 0.2 to about 10 weight percent sulfur above residual sulfur initially present in the red mud prior to reaction with the sulfidizing compound.

19. The process of claim 11 wherein the reaction product is formed at a reaction temperature from ambient temperature up to about 60° C.

20. The process of claim 11 wherein the reaction product is formed at ambient temperature.

21. A process of extracting heavy metal ions from a medium, comprising contacting the medium with a sorbent comprising sulfidized red mud, the sulfidized red mud comprising a reaction product of a sulfidizing compound and red mud at a reaction temperature up to about 200° C. and a reaction pressure from atmospheric pressure up to about 30 psi in an aqueous slurry.

22. The process of claim 21 wherein the sulfidizing compound is selected from the group consisting of $H_2S$, $Na_2S$, $K_2S$, $(NH_4)_2S$, $CaS_x$, and combinations thereof.

23. The process of claim 21 wherein the reaction product contains from about 0.2 to about 10 weight percent sulfur above residual sulfur initially present in the red mud prior to reaction with the sulfidizing compound.

* * * * *